United States Patent [19]
Gischel

[11] 3,890,233
[45] June 17, 1975

[54] APPARATUS FOR FILTERING RADIOACTIVE FLUIDS

[76] Inventor: Edwin H. Gischel, 107 Ardwick Ter., Lansdale, Pa. 19446

[22] Filed: Apr. 25, 1974

[21] Appl. No.: 463,974

[52] U.S. Cl. ............................... 210/237; 210/241
[51] Int. Cl. ........................................... B01d 29/02
[58] Field of Search ............ 210/232, 237, 238, 241

[56] References Cited
UNITED STATES PATENTS

| 306,299 | 10/1884 | Webster | 210/237 X |
| 709,616 | 9/1902 | Thorne | 210/237 |
| 2,909,285 | 10/1959 | Besler | 210/237 X |

Primary Examiner—John Adee
Attorney, Agent, or Firm—Howson & Howson

[57] ABSTRACT

Apparatus is provided for filtering radioactive particles from the cooling and/or auxiliary process water of a nuclear reactor, or nuclear fuel processing plant, or other installations wherein radioactive fluid systems are known to exist. The apparatus affords disposal of the captured particles in a manner which minimizes the exposure of operating personnel to radioactivity. The apparatus comprises a housing adapted to contain a removable filter cartridge assembly, a valve normally closing the lower end of the housing, an upwardly-open shipping cask located below the valve, and an elongated operating rod assembly projecting upwardly from the filter cartridge assembly and through the upper end of the housing to enable a workman to dismount the filter cartridge assembly from its housing and to lower the filter cartridge assembly through the valve and into the cask from a remote location above the housing. The filter cartridge assembly is releasably connected to the operating rod assembly and is capable of being disconnected therefrom when the operating rod assembly is displaced downwardly and rotated after the cartridge is loaded in the cask. The apparatus is surrounded by a mass of concrete to absorb radiation emitted from within the filter housing, and additional structural elements are provided to ensure the safety of operating personnel.

19 Claims, 5 Drawing Figures

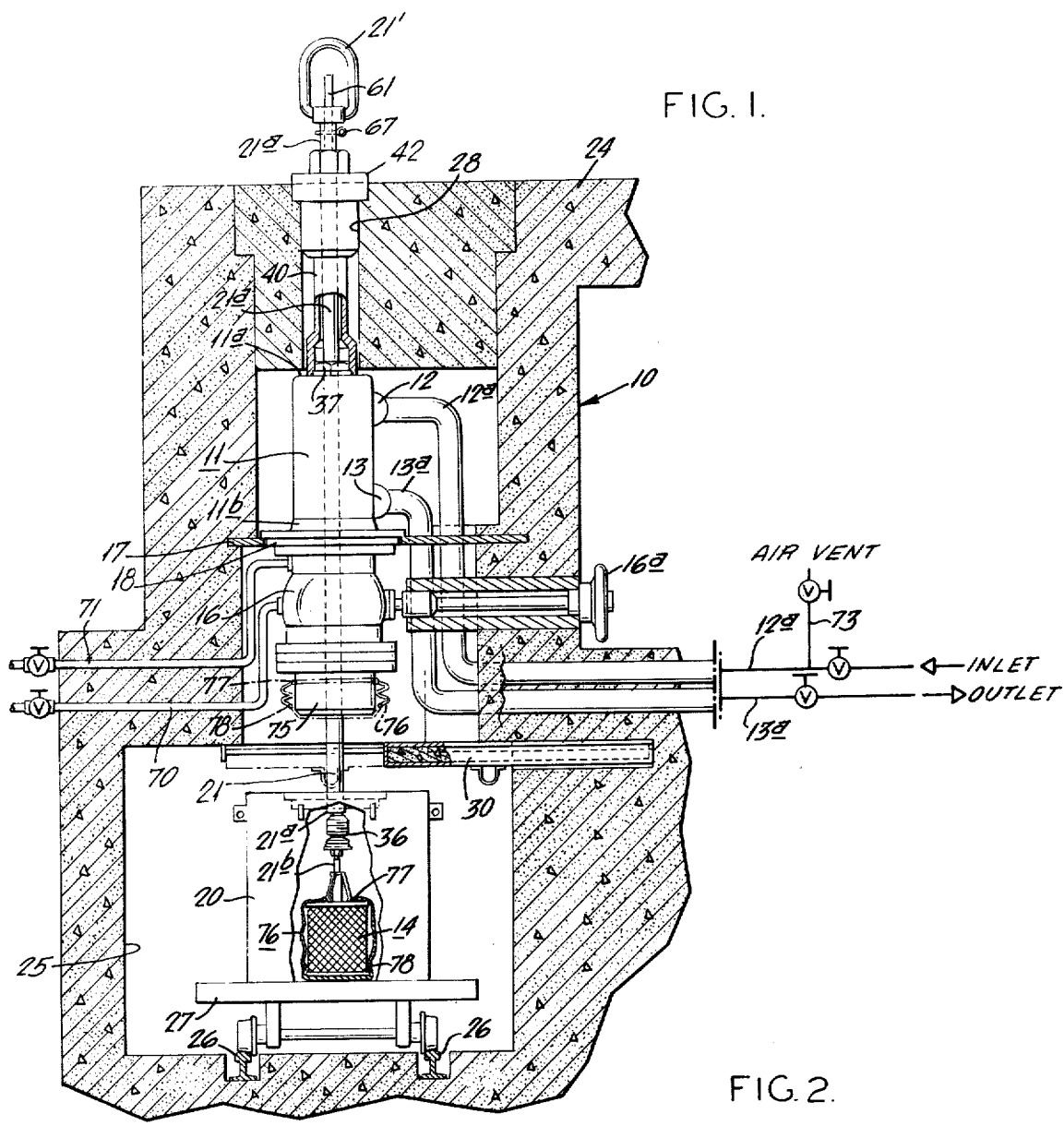

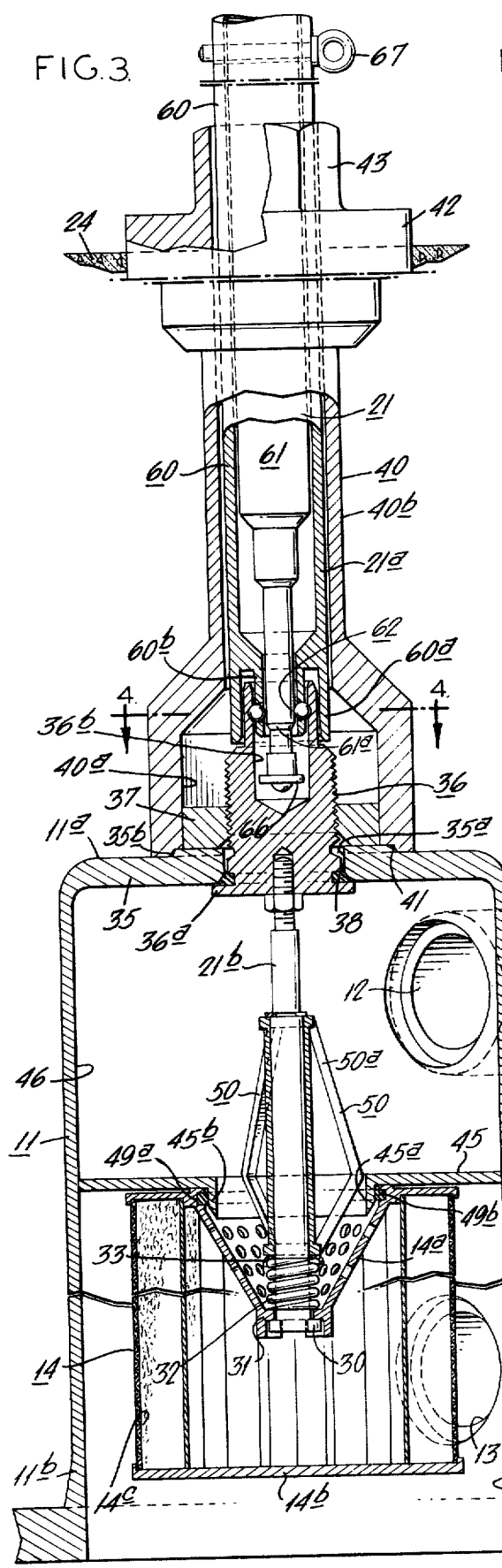
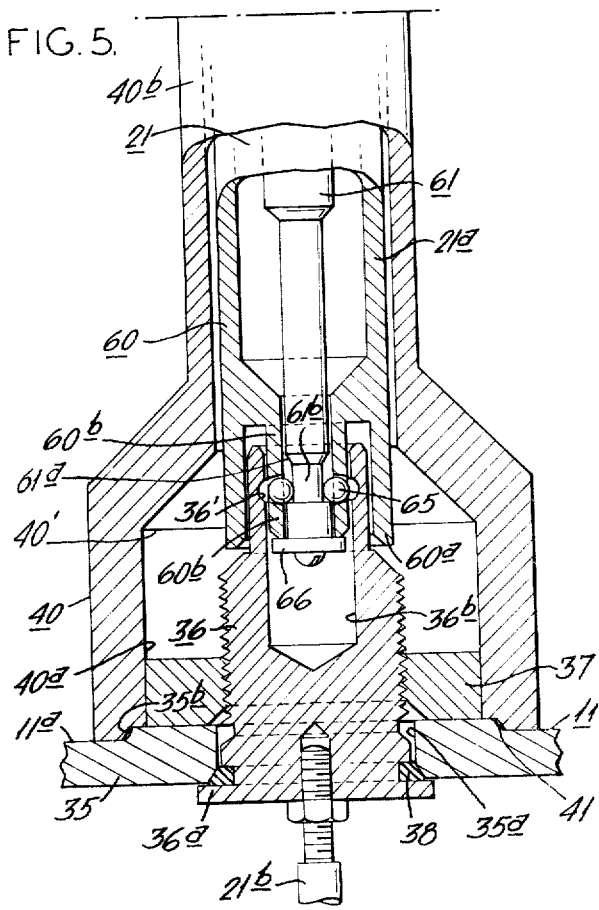
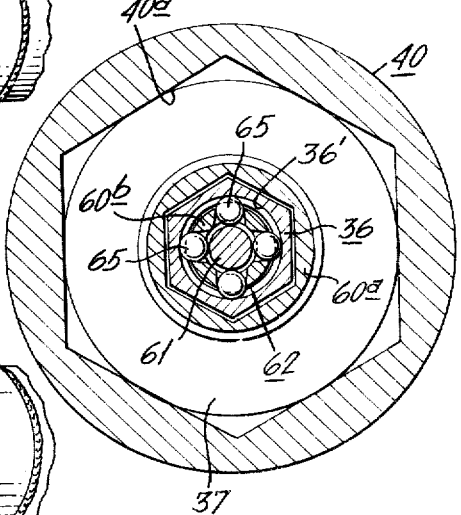

APPARATUS FOR FILTERING RADIOACTIVE FLUIDS

The present invention relates to filters, and more particularly, the present invention relates to apparatus for filtering radioactive particles from fluids associated with a nuclear reactor or other source of radioactivity.

The present invention is described in Disclosure Document No. 022375 filed in the Patent Office on Sept. 13, 1973.

In a nuclear power plant, a coolant is circulated around the core of the reactor as a heat transfer medium which transfers the heat generated in the reactor to apparatus wherein the heat may be further transferred and/or extracted. Coolant branch circuits are provided, and they are utilized for many purposes such as coolant volume control, coolant water chemistry control, reactivity control, etc. The reactor coolant system, its associated branch circuits (commonly known as auxialiary process systems) and their related components compose a major portion of the fluid system of a nuclear power plant or other nuclear reactor installation.

During operation of a nuclear reactor, or other source of radioactivity, particles of foreign matter resulting from corrosion of the coolant and auxiliary process system piping, tend to become entrained in the coolant and to circulate therewith around the core of the reactor and through the associated cooling and process equipment and piping. As the particles flow around the source of radioactivity they become radioactive, and they tend to accumulate at various locations in the piping systems and emit radioactive energy. Depending upon the shielding associated with the piping system, the emission of radioactivity from the accumulated particles tends to create health hazards for personnel working in and about the radioactive fluid systems and/or associated components.

In order to control the quantity of foreign matter flowing in the cooling and process systems, some nuclear power plants and other installations are provided with filters to collect the radioactive particles for removal from the coolant and process systems. Some conventional filter housings employed to capture radioactive particles have a top hatch affording installation and removal of a removable filter cartridge from above. However, since the particle-laden cartridge is usually placed in a standard upwardly-open shielded shipping cask for ultimate disposal, top-loaded filters present serious radiation exposure problems because of the absence of adequate shielding and other protection to operating personnel during cartridge changing. To ameliorate the magnitude of this problem, a filter cartridge transfer cask is known to have been used to shield operating personnel from the aforementioned radiation exposure. However, this solution has not been adequate since the highly radioactive filter cartridge must then undergo two transfers, one from housing to the transfer container, and the other from the transfer container to the shipping cask. In addition, the transfer container requires a considerable decontamination effort after each cartridge change, thereby subjecting operating personnel to additional radiation exposure.

A so-called bottom-loaded filter is known in the art. Such a filter has a housing with a bolted-on bottom hatch which closes the bottom of the housing and which functions when in place to mount a filter cartridge inside the housing. The cartridge is uncontrollably dropped into an upwardly-open shipping cask or receptacle after the hatch is disconnected from the housing and slid transversely thereto. This type of filter has certain limitations. For instance, due to the uncontrolled manner in which the cartridge is removed, the filter size is limited to relatively small units to reduce the hazards of splashing, and the units must be manifolded to provide sufficient filtering capacity. Splashing causes serious airborne and surface contamination hazards to the immediate environment, and undue exposure hazards are presented to operating personnel. Moreover, the filter cartridge may not be changed readily because of the time required to dismount the hatch, and to clean up and decontaminate the surrounding area afterward, etc. Accordingly, known bottom-loaded filters are not as satisfactory as desired.

Known radioactive fluid filters have been operationally limited to removing only relatively large particles from the cooling fluid of nuclear reactors. This is because a filter capable of capturing the many very small particles known to be present in the coolant and process fluids would tend to emit excessive amounts of radioactivity due to the mass of particles captured thereby. As a result, high efficiency (very small particle-retention size) filters have not found wide usage to date because of the exposure problems associated with changing the cartridges. In addition, due to the aggravated handling problems resulting from the increasing levels of radiation, filter cartridges presently used are frequently removed and disposed of as radioactive waste before they are fully utilized. As a result, the amount of radioactive waste (radwaste) handled is significantly greater than would otherwise be necessary if the handling problems could be resolved.

Since known filters are not utilized to remove the many small particles entrained in the fluid streams, higher inventories of radioactive materials than desired are contained within the fluid. The higher inventory of radioactive material in the fluids not only increases personnel exposure problems, but it also causes the generation of significant quantities of additional radwaste for disposal as a result of the increased quantities of washdown fluids necessary to clean up leaks and spills. Moreover, additional containment and cleaning materials are required for equipment maintenance, etc.

It is known that the radwaste must be transported over public accessways enroute to its burial site. With such transportation is the ever present risk of an accidental discharge of radioactivity. Since the risk is related to the number of vehicles miles the waste is transported, it should be apparent that a reduction in the overall volume of waste transported reduces the risk. Furthermore, there is a need for means whereby a reduction may be effected in the overall volume of radwaste buried.

With the foregoing in mind, it is a primary object of the present invention to provide novel apparatus for filtering radioactive particles from fluids.

It is another object of the present invention to provide an improved filter which has a removable cartridge capable of being controllably changed from a remote location.

It is a further object of the present invention to provide filtering apparatus which is relatively simple in construction and highly reliable in use and which is, therefore, particularly suited for filtering radioactive particles from a cooling and other fluid in a nuclear power plant and other installations where equipment reliability is an important consideration.

Yet another object of the present invention is to provide a filtration system which enables a filter cartridge to be controllably removed from its housing and loaded directly into a shipping cask by a workman standing at a location remote from the shipping cask to reduce the exposure of the workman to radioactivity during the course of changing the filter cartridge.

As a further object, the present invention provides improved radioactive fluid filtration apparatus which is capable of filtering substantial amounts of radioactive material from a fluid without resulting in excessive radiation exposure to workmen while changing the filter cartridges.

It is another object of the present invention to provide high efficiency filtration equipment whereby the inventory of radioactive material contained in fluid systems can be substantially reduced below presently-tolerated values.

Another objective of the present invention is to provide means for accumulating a relatively large quantity of radioactive material in a relatively small volume, such as a filter cartridge assembly, to substantially reduce the overall volume of radwaste transported publicly, whereby the risk of accidental discharge of radioactivity to the environment, as well as to the general public, is significantly reduced.

A further object of the present invention is to provide means for reducing the overall volume of radwaste which requires burial as a result of the operation and maintenance of nuclear power plants, nuclear fuel processing plants, and other installations wherein radioactive fluid systems are known to exist, and therefore to reduce the overall threat to the environment which exists by virtue of current radwaste disposal practices.

More specifically, the present invention provides filtration apparatus which is particularly suited for use in removing radioactive particles from the cooling and auxiliary process fluids of a nuclear reactor or from radioactive fluid streams in other installations. The apparatus comprises a housing, a filter cartridge assembly removably mounted within the housing, and valve means normally closing the lower end of the housing but operable when open to afford axial movement of the filter cartridge assembly therethrough during changing of the filter cartridge assembly. The filtering apparatus is shielded by a concrete structure, and an operating rod assembly is provided to connect and disconnect the filter cartridge assembly to the housing from a remote location above the housing. The operating rod assembly permits the filter cartridge assembly to be lowered axially through the open valve and into an upwardly-open shipping cask located below the valve in an access tunnel in the shielding. After the filter cartridge assembly is safely loaded into the shipping cask, it is disconnected from the operating rod upon combined downward and rotary movement thereof. After the shipping cask containing the radioactive filter cartridge is removed, a new filter cartridge assembly is connected to the bottom of the operating rod, and the rod is lifted axially upward to insert the new filter cartridge assembly into the housing and to connect the same in operating relation therein.

These and other objects, features and advantages of the present invention should become apparent from the following description when taken in conjunction with the accompanying drawings in which:

FIG. 1 is an end elevation view with portions broken away of filtration apparatus embodying the present invention;

FIG. 2 is a side elevation view in reduced scale of the apparatus of FIG. 1;

FIG. 3 is a greatly enlarged and vertically foreshortened longitudinal sectional view of a portion of the apparatus illustrated in FIG. 1 in one operating position;

FIG. 4 is an enlarged sectional view taken along lines 4—4 of FIG. 3; and

FIG. 5 is an enlarged sectional view illustrating a portion of the apparatus of FIG. 3 in a different operating position.

Referring now to the drawings, there is illustrated in FIG. 1 filtering apparatus 10 embodying the present invention. As may be seen therein, the apparatus 10 comprises an upstanding hollow cylindrical housing 11 having an inlet 12 and an outlet 13. The inlet 12 and outlet 13 are connected by pipes 12a and 13a, respectively, to the coolant or auxiliary process system piping of a nuclear reactor or other source of radioactivity (not shown) wherein a cooling or process fluid is flowed therearound to remove heat and/or otherwise to control various operating parameters of the same. As noted heretofore, particulate matter entrained in the cooling and/or process fluid tends to become radioactive as it flows around the source of radioactivity.

In order to capture particulate matter as it flows through the filter housing, a filter cartridge assembly 14 is mounted in the housing and is capable of being removed and replaced after a period of operation. Since the filter cartridge assembly is likely to contain a significant amount of radioactive particles, it is important from a radiation standpoint for the filter cartridge assembly 14 to be changed in a manner which minimizes the exposure of operating personnel to the radiation emitted thereby. In addition, it is important for the filter cartridge assembly 14 to be under positive control of the operating personnel during the changing process in order to prevent the inadvertent release of radioactive material to the surroundings.

In accordance with the present invention, the apparatus 10 affords changing of the filter cartridge assembly 14 by a workman standing at a safe location remote from the housing 11. To this end, the housing 11 has a closed upper end 11a with an aperture 35a therein and an open lower end 11b. A valve 16 is connected to the lower end 11b of the housing 11 by means of a so-called dutchman connection 18. This type of connection affords removal of the valve 16 from below for maintenance purposes by providing valve-mounting bolt circle outwardly of the valve body so that the bolts may be loosened from below. When closed, the valve 16 provides a fluid-tight closure for the bottom of the housing 11; however, when open, the valve 16 permits the filter cartridge assembly 14 to be raised and lowered therethrough by means of an elongated operating rod assembly 21 connected to the filter cartridge assembly 14.

In order to safely receive filter cartridge assembly 14, an upwardly-open shipping cask 20 is disposed below the valve 16 before the radioactive filter cartridge assembly 14 is lowered. However, in order to protect operating personnel from exposure to radioactivity during changing of the filter, the housing 11 and the valve 16 are surrounded by a concrete shield structure 24. The apparatus 10 is supported inside the shield structure 24 by a mounting plate 17 to which the lower end 11b of the housing 11 is attached.

As best seen in FIG. 2, the filtering apparatus 10 is associated with a series of like apparatus disposed in a battery or row, and the shielding structure 24 has an access tunnel 25 (FIG. 1) which is located below the valve 16 and which underlies the row of filters 10,10. A pair of tracks 26,26 are provided in the tunnel 25 for guiding a dolly 27 in a path below the row of filters. With this structure, the shipping cask 20 may be supported on the dolly 27 and rolled into position below the desired filter to dispose the cask 20 in registry with the valve 16 for receiving the filter cartridge assembly 14. After the filter cartridge assembly is loaded into the cask 20, the dolly 27 is removed from the tunnel 25, and a lid 22 installed on the shipping cask 20 to permit the filter cartridge assembly 14 to be shipped safely in the cask 20 to a disposal location. In the illustrated embodiment, the dolly 27 is advanced on the tracks 26,26 by a chain or cable 23 connected to a winch (not shown) and a conventional indicator mechanism may be utilized in conjunction with the chain 23 or winch to provide an indication of the position of the dolly 27 in the tunnel 25 to ensure proper registry of the shipping cask 20 with respect to the valve 16. It is noted that the winch mechanism (not shown) is located outside of the tunnel 25. Thus, safe access to the winch is provided at a location remote from the radioactive filter cartridge assembly 14 (inside the cask 20 on the dolly 27) in the event the winch mechanism should fail with the cask 20 out of reach of the transport system (not shown). As a result, repair work on the winch may be performed while the cask 20 and its radioactive contents are still safely located in the tunnel.

After the particle-laden filter cartridge assembly 14 is removed, and the dolly 27 is removed from the tunnel 25, it is necessary for a workman to enter the tunnel 25 to connect a new filter cartridge assembly 14 to the bottom of the operating rod assembly 21. In order to protect the workman from radiation streaming downwardly from other filters in the row which may be on stream, a radiation shield 30 is slidably mounted in the top of the tunnel 25 for movement transversely to the path of movement of the filter cartridge assembly 14. The shield is movable from the full-line position illustrated in FIG. 1 during filter changing to the broken line position illustrated therein when the filter is operational. The shield 30 is preferably fabricated of steel of sufficient thickness as to reduce the intensity of radiation streaming downwardly into the tunnel 25 so that a workman may walk back and forth in the tunnel 25 under the filters with a minium of exposure to dangerous levels of radioactivity.

In order to mount the filter cartridge assembly 14 in the housing 11 and to dismount the same therefrom, access to the upper end 11a of the housing 11 is provided in the concrete shield 24 by a vertically-disposed opening 28 through which the filter cartridge assembly operating rod assembly 21 projects. The rod assembly 21 includes an elongated upstanding upper portion 21a which is displaceable axially in the opening 28 and which is provided at its upper end with a bail 21' engageable by a hoist (not shown) for raising and lowering the operating assembly and filter cartridge assembly 14 connected therewith. If desired, a spring scale (not shown) may be connected between the bail 21' and the hoist to provide load indication and overload protection for preventing excessive upward force from being applied to the operating assembly 21 during installation of a new filter cartridge assembly 14 in the housing 11. With this structure, the filter cartridge assembly 14 may be raised into operating relation inside the housing 11 by a workman standing on a walkway on top of the concrete shielding 24.

The filter cartridge assembly 14 is releasably connected to the operating assembly 21 in a manner which permits disengagement of the filter cartridge assembly 14 from the operating assembly 21 after the filter cartridge assembly 14 is safely loaded into the cask 20. For this purpose, the operating rod assembly 21 has a lower portion 21b which depends into the interior of the housing 11 and which is connected to the filter cartridge assembly 14 by a locking mechanism which affords disconnection upon a combined downward axial and rotary movement of the operating rod assembly 21. In the present instance, the locking mechanism includes cooperating lugs and shoulders 30 and 31, respectively, on the bottom of the lower portion 21b of the operating rod assembly 21 and the filter cartridge assembly 14, respectively. A coil spring 32 is interposed between the upper surface of the shoulder 31 and a retainer 33 carried by the lower portion 21b of the operating rod assembly 21. The lugs and shoulders 30 and 31 are shaped to engage one another and to prevent rotation relative to one another when the operating rod assembly is disposed in the full line configuration illustrated in FIG. 3 and to disengage one another when the lower portion 21b is depressed and rotated 90° about its axis. The spring 32 ensures mating engagement of the lugs and shoulders 30 and 31 with one another to prevent the filter cartridge assembly 14 from being inadvertently disconnected while being raised and lowered. Of course, after the filter cartridge assembly 14 is placed into the shipping cask 20, simple downward and rotary movement of the operating rod assembly 21 is sufficient to disconnect the filter assembly 14.

The filter cartridge assembly 14 is securely mounted inside the housing 11 but is capable of being dismounted readily therefrom by a workman at the above-noted remote location. To this end, the housing 11 has a transverse end wall 35 which closes its upper end 11a, and the lower portion 21b of the operating rod assembly 21 has an upstanding post 36 which projects upwardly through a central aperture 35a in the end wall 35 of the housing 11. The post 36 has a radially-extending peripheral shoulder or flange 36a which engages the underside of the end wall 35 around the aperture 35a, and the post 36 has external threads outside of the end wall 35a. A nut 37 threadedly engages the post 36 and is operable upon rotation in one direction to draw the shoulder 36a upwardly against an O-ring seal 38 to close the aperture 35a and provide a fluid-tight closure for the upper end of the housing 11. Of course, rotation of the nut 37 in the opposite direction disconnects the post 36 therefrom, thereby permitting the filter cartridge assembly 14 to be lowered by means of the operating rod assembly 21.

In order to rotate the nut 37 in opposite directions, a socket wrench 40 is provided. The socket wrench 40 has a socket 40a and an upwardly-projecting torque-tube or extension 40b which terminates at its upper end in an enlarged flange 42 with wrench flats 43 adjacent thereto. The flange 42 functions as a streaming collar to prevent radiation from streaming through the opening 28. The inside of the socket 40a is provided with a shoulder 40' which is so located with respect to the post 36 as to be engaged by the nut 37 when rotated away from the end wall 35 of the housing 11 before being completely disengaged from the threads on the post 36. Thus, the weight of the socket wrench 40 applies a slight positive downward pressure to the nut 37 to assist in thread re-engagement between the post 36 and the nut 37 during installation of the new filter cartridge assembly 14. This structure ensures threaded engagement of the nut 37 with the post 36 after the filter assembly 14 is mounted in the housing 11. It is noted that the end wall 35 of the housing 11 has a boss 35b which engages in an annular recess 41 in the bottom of the socket 40a, and the shoulder 40' is also so located with respect to the boss 35b and the annular recess 41 as to prevent disengagement thereof with the nut 37 completely disengaged from the post 36. This structure functions to maintain the socket wrench 40, nut 37, and operating rod assembly 21 in proper registry with the aperture 35a in the end wall 35 of the housing 11 during raising and lowering of the operating rod assembly 21 and filter cartridge assembly 14 through the housing 11. It also prevents the external threads on the post 36 and the outside surfaces of the operating rod assembly 21 from contacting and possibly scoring or otherwise damaging the O-ring 38 seat in the aperture 35a in the end wall 35 of the housing 11.

The filter apparatus 10 of the present invention is efficient in operation. To this end, a partition 45 extends horizontally across the housing 11 and divides the interior of the housing 11 into an inlet chamber 46 and an outlet chamber 47 therebelow. The partition 45 has a central port 45a, and the filter cartridge assembly 14 has an inlet 14a in registry with the port 45a. In the illustrated embodiment, the inlet of the filter cartridge assembly 14 is provided by a perforated funnel-shaped recessed wall 14a which depends from the port 45a into the interior of the filter cartridge assembly 14. The bottom of the filter cartridge assembly 14 has an imperforate end wall 14b and a tubular filter medium 14c which extends between the inlet wall 14a and the bottom wall 14b. Thus, particle-laden fluid flows downwardly through the port 45a and into the interior of the filter cartridge assembly 14 before exiting laterally through the filter medium 14c into the outlet chamber 47. As a result, particulate matter is trapped within the interior of the filter cartridge assembly 14 and is safely contained therein during changing. It is noted that an annular neck 45b depends from the partition 45 around the port 45a, and the recessed inlet 14a of the filter cartridge assembly 14 has an annular groove 49a which mounts an O-ring gasket 49b which engages the outside of the neck 45b to provide a fluid-tight joint therebetween to ensure that the flow of particle-laden fluid downwardly into the inlet 14a of the filter cartridge assembly 14 does not bypass the filter medium 14c. The O-ring gasket 49b is captured in the groove 49a and is, therefore, disposable along with the filter cartridge assembly 14. The seal around the periphery of the neck permits sealing the fluid-tight joint between the neck and the filter assembly 14 while simultaneously sealing the O-ring 38 on the post 36 against the seat in the aperture 35a in the end wall 35 of the housing 11 as the filter cartridge assembly 14 is drawn upwardly tightly into position below the partition 45. This structure avoids adherence to close machining tolerences to insure simultaneous seating. Because the filter cartridge inlet 14a is recessed downwardly, the effective height of the filter cartridge is increased since the overall height of the filter cartridge is limited by the height of the shipping cask 20. This increased effective height of the filter cartridge extends the cartridge life permitting it to collect additional particulate thereby enabling larger accumulations of radwaste to be disposed of in each cask which results in a further reduction of the total volume of radwaste to be transported and buried.

In order to guide the inlet 14a of the filter cartridge assembly 14 into proper registry with the port 45a during reinsertion of a new filter cartridge assembly 14 into the housing 11, guide means in the form of a plurality of radially extending vanes 50,50 are provided on the lower portion 21b of the operating rod assembly 21. Each vane has an edge 50a which tapers outwardly and downwardly from a location adjacent the post 36. The edge 50a is adapted to engage the neck 45b around the port 45a to align the inlet 14a of the filter cartridge assembly 14 with the port 45a during movement of the filter cartridge assembly 14 upwardly in the housing 11. Of course, the vanes 50,50 also operate to streamline the flow of fluid downwardly through the port 45a and into the inlet 14a of the filter cartridge assembly 14, and they cooperate with the neck 45b to prevent lateral movement of the filter cartridge assembly during operation.

In order to require only one operating rod assembly to change cartridges in each of the filter assemblies in the row of filters, the upper portion 21a of the operating rod assembly 21 is releasably connected to the lower portion 21b. To this end, the operating rod assembly 21 comprises an upstanding hollow elongated tube 60 which is located interiorily of the socket wrench 40 and which receives an elongated rod 61 therewithin. The lower end of the tube 60 carries a gripping assembly 62 which is operable upon downward displacement of the rod 61 to grip the top of the post 36 for coupling the tube 60 therewith. In the illustrated embodiment, the lower end of the tube 60 has a wall 60a with a plurality of internal flats adapted to engage a like plurality of external flats on the outside of the upper end of the post 36 to prevent rotation of the tube 60 relative to the post 36. The lower end of the tube 60 has another wall 60b adapted to be received in a recess 36b in the top of the post 36. The inner wall 60b of the tube 60 has a plurality of tapered apertures which mount a like plurality of movable balls 65,65. The balls 65,65 are cammed outwardly into a detent 36' in the recess 36b by a tapered shoulder 61a on the rod 61. With this structure, displacement of the rod 61 downwardly into the position shown in FIG. 3 causes the balls 65,65 to be cammed outwardly into the detent 36' to span across the space between the inner wall 60b of the tube 60 and the post 36 to couple the same together. When the rod 61 is in this position, a locking pin 67 is inserted in aligned transverse bores in the upper end of the rod 61 and the tube 60 to connect the rod and tube together to maintain the balls 65,65 engaged in the detent 36' and to rigidly couple the filter cartridge assembly 14 to the operating rod assembly 21 so that the filter cartridge assembly 14 may be raised and lowered upon axial movement of the operating assembly 21. Of course, the lower end of the rod 61 is provided with a recess 61b which is adapted to contain the balls 65,65 when the pin 67 is removed and the rod 61 moved upwardly for uncoupling the operating assembly 21 from the filter cartridge assembly 14. A plate 66 is fastened to the bottom of the rod 61 and engages the bottom of the inner wall 60b of the tube 60 to limit upward movement of the rod 61 relative to the tube 60. Moreover, it is noted that the flats on the tube 60 and the post 36 cooperate to prevent rotation of the post 36 relative to the tube 60 when a workman applies a counter torque between the tube 60 and the wrench flats 43 on the socket wrench 40 to rotate the nut 37 in opposite directions.

In the present invention, the valve means 16 preferably includes a conventional ball-type valve having a through bore sized to permit the passage of the filter cartridge assembly 14 therethrough. Such a ball valve normally has an upper and a lower seat which provides a double seal against leakage from the housing 11 when the valve is closed. However, in order to detect wear of the upper seat, it is desirable for a telltale drain 70 (FIG. 1) to be connected to the valve 16 intermediate the seats. Moreover, it is desirable for another drain 71 to be connected between the bottom of the housing 11 and the upper seat of the ball valve 16 to cooperate with an air vent 73 in the inlet pipe 12a to permit the housing 11 to be drained substantially completely before the ball valve 16 is opened to change the filter cartridge assembly 14. Preferably, the operator 16a for the ball valve 16 extends through the concrete shielding 24 to protect operating personnel from excessive radiation exposure when opening and closing the valve 16. To prevent inadvertent opening of the ball valve 16 when the filtering apparatus 10 is on-stream, the operator 16a is disconnected from the ball valve 16 and suitable safety interlock devices (not shown) may be provided to prevent inadvertent opening.

The valve 16 is normally closed to cause fluid carrying radioactive particles to enter the housing 11 through the inlet 12 and to exit the housing through the outlet 13. Since a small amount of fluid may remain in the bottom of the housing 11 after being drained, and since the fluid is likely to contain radioactive particles, it is desirable for the fluid and particles to be discarded in a safe manner along with the filter cartridge assembly 14. For this purpose, a tubular extension 75 depends from the bottom of the ball valve 16 and terminates above the shield 30 in the top of the tunnel 25. A bag 76 is releasably fastened to the extension 75 by means of a garter 77 which engages the outer periphery of the extension 75. The bottom of the bag 76 extends across the open lower end of the tubular extension 75 and another garter 78 is provided near the bottom of the bag 76 to permit the bag to be mounted in the collapsed configuration illustrated in broken lines in FIG. 1 with its bottom extending across the bottom of the tubular extension 75. Preferably, the bag is constructed of a waterproof material and it may contain a fluid absorbent material. Thus, when the valve 16 is opened, any fluid remaining in the bottom of the housing 11 drains downwardly into the bag 76 and is absorbed by the absorbent material therein. When the filter cartridge assembly 14 is lowered through the tubular extension 75, the bottom of the filter cartridge assembly 14 pulls the bag 76 from the extension 75. The lower garter 78 constricts around the lower portion of the filter cartridge assembly 14, and the upper garter 77 constricts around the upper portion of the filter cartridge assembly 14 upon continued downward movement of the filter cartridge assembly 14. By virtue of this structure, all of the radioactive fluid and particles contained in the housing 11 are discharged along with the filter cartridge assembly 14 into the shipping cask 20.

In use, a new filter cartridge assembly 14 is attached to the bottom of the operating rod assembly 21 by a workman in the tunnel 25. The operating assembly 21 and the filter cartridge assembly 14 are then raised vertically until the filter cartridge assembly 14 is properly secured inside the housing 11, as noted heretofore. A new bag 76 is mounted on the valve extension 75, and the shield gate 30 is closed. The valve 16 is then closed and the nut 37 is engaged with the threads on the post 36 and tightened using the socket wrench 40 to seat the O-ring 38 against its seat in the aperture 35a in the top end wall 35 of the housing 11. The upper portion 21a of the operating rod assembly 21, and the socket wrench 40 may then be removed from the access opening 28, and a shielded tooling plug (not shown) may be installed into the opening 28. After closing the valve in the drain line 71 and the valve in vent line 73, the filter apparatus may be placed back on stream by opening the valve in the outlet line 13a, venting entrained air through the valve in the vent line 73, then opening the valve in the inlet line 12a.

To change the filter cartridge assembly 14, this procedure is essentially reversed; however, the shipping cask 20 is located directly below the valve 16 and housing 11 in the tunnel 25 for receiving the filter cartridge assembly 14 when dismounted from the housing and lowered downwardly. After the filter cartridge assembly 14 is uncoupled from the operating rod assembly, as noted above, the operating rod assembly 21 is raised a sufficient distance to permit the dolly 27 and shipping cask 20 to be moved out of the tunnel so that the lid 22 may be placed thereon, as illustrated in FIG. 2. The cask 20 and filter cartridge assembly 14 stowed therein may then be safely transferred to another location to be prepared for shipment and burial.

In view of the foregoing, it should be apparent that there has now been provided improved apparatus for filtering fluids, and particularly a fluid containing radioactive particles such as the cooling fluid of a nuclear reactor. The apparatus has a minimum of moving parts; it is relatively simple to operate; and most importantly, it affords disposal of captured radioactive particles with a minimum of exposure of operating personnel to radioactivity.

Moreover, the apparatus of the present invention even permits very fine radioactive particles to be removed from the fluid and discarded safely since it is capable of capturing a large quantity of particles and disposing of the same in a safe manner.

While a preferred embodiment of the present invention has been described in detail, various modifications, alterations and changes may be made without departing from the spirit and scope of the present invention as defined in the appended claims.

I claim:

1. Fluid filtration apparatus comprising:
   a filter housing having an end wall with an aperture therein and an open end opposite said aperture in said wall,
   filtering means adapted to be removably contained inside said housing, valve means associated with the open end of said housing, said valve means having one operating position closing said open end of said housing and another operating position affording displacement of said filtering means therethrough into and out of said housing, a valve operator connected to said valve means and operable from a location spaced therefrom to afford actuation of said valve means between said operating positions, rigid elongated operator means associated with said filtering means and displaceable through said aperture for moving said filtering means into and out of said housing through said valve means, said operator means having a post portion received within said aperture and projecting outwardly of said end wall when said filtering means is mounted in operating relation in said housing, means releasably engaging said post outside of said housing end wall for removably mounting said filtering means in said housing, and, means providing a coupling of said filtering means to said operator means releasable at a location remote from said filtering means by movement of said operator means, whereby the filtering means may be removed from the housing from a location remote from its open end.

2. Apparatus according to claim 1 wherein said post is threaded outside of said housing and has shoulder means extending across said aperture inside said housing end wall, and said releasable engaging means includes nut means engageable with said threaded post and rotatable relative to said post to displace said filtering means toward said closed end upon rotation in one direction, said nut means being disengageable from said post upon rotation in an opposite direction, whereby said operator means may be displaced axially through said aperture and housing and said filtering means removed from said housing upon disengagement of said nut means from said post.

3. Apparatus according to claim 2 wherein said operator means has an extension connected to said post in said housing, and said releasable coupling means includes cooperating locking means carried by said extension and said filtering means and operable to couple and uncouple said filtering means to said extension upon combined axial and rotary motion of said extension relative to said filtering means.

4. Apparatus according to claim 3 wherein said locking means includes lug means on said operator extension and shoulder means on said filtering means, said lug means being engageable with said shoulder means when said operating means is in one rotary position and disengageable from said shoulder means when said operating means is in another rotary position relative to said filtering means, said shoulder means being shaped to prevent rotation of said lug means relative thereto until said operator means is displaced axially toward said filtering means, and resilient means carried by said operator extension for biasing said shoulder means into engagement with said lug means.

5. Apparatus according to claim 1 including a partition extending in said housing transversely to said ends for dividing said housing into an inlet chamber and an outlet chamber, said partition having a port providing fluid communication between said chambers with said port being in registry with said aperture in said closed end to afford movement of said operator means through said partition, said filtering means having a central inlet and being mounted in said housing intermediate said partition and said valve means with its inlet in registry with said port in said partition.

6. Apparatus according to claim 5 wherein said filtering means includes a tubular filter medium, an imperforate wall disposed transversely to said medium a spaced distance from said port, and means providing a perforate wall in registry with said port, so that particulate matter is captured in the interior of said medium when fluid is flowed through said port and into said filtering means.

7. Apparatus according to claim 6 wherein said perforate wall depends into said tubular filter medium and defines an inlet opening, and said partition has an annular neck surrounding said port, said neck being received in the inlet opening provided by said perforate wall, and including gasket means interposed between said neck and said perforate wall and groove means in said perforate wall mounting said gasket means for disposal with said filtering means.

8. Apparatus according to claim 5 including guide means movable axially with said operator means for positioning said filtering means inlet in registry with said port when said operator means is displaced to position said filtering means in said housing, said guide means extending through said port and tapering outwardly of said extension and toward said filter means to engage the port and cam the filter means inlet into proper registry therewith.

9. Apparatus according to claim 1 wherein said valve means includes a ball valve having a flow passage sized to permit passage of said filtering means therethrough when in said open position.

10. Apparatus according to claim 1 wherein said valve means includes a ball valve having a flow passage sized to permit passage of said filtering means therethrough when in said open postion.

11. Apparatus according to claim 2 wherein said operator means includes a tube axially engageable with said post outside of said housing, a rod slidable axially in said tube, and gripping means associated with said rod and tube and operable upon axial displacement of said rod in opposite directions relative to said tube to couple and uncouple said post and tube.

12. Apparatus according to claim 11 including means surrounding said tube for rotating said nut means, and means to prevent rotation of said tube relative to said post during rotation of said nut means.

13. Apparatus according to claim 12 wherein said rotation preventing means includes at least one flat on said tube and a mating flat on said post, and including means releasably locking said rod in an axial position in said tube with said gripping means engaged with said post.

14. Apparatus according to claim 12 wherein said nut rotating means includes a socket engageable with said nut and a torque tube surrounding said operator tube, and including means on the outside of said housing end wall and said socket rotatably engageable with one another when said socket is engaged with said nut to maintain said nut, said post and said operator tube in registry with the aperture in said end wall when said nut is disengaged from said post during changing of said filtering means.

15. Apparatus according to claim 14 wherein said rotatable engaging means on said housing and socket includes a boss surrounding said aperture in said housing end wall and a recess in said socket engageable with said boss, said socket being dimensioned axially relative to said post and said nut to afford disengagement of said nut from said post without causing disengagement of said boss from said socket recess when said nut is rotated away from said housing and to apply positive downward force on said nut to cause threads on said nut to engage threads on said post during installation of said filtering means without causing disengagement of said boss from said socket recess when said shoulder on said post is raised into engagement with underside of said aperture in said end wall in said housing.

16. Apparatus according to claim 10 including means connected between said closest valve seat and said housing to provide a drain for said housing.

17. Fluid filtration apparatus, comprising:
 a filter housing having an end wall with an aperture therein and an open end opposite said aperture in said wall,
 filtering means adapted to be removably contained inside said housing,
 valve means associated with the open end of said housing, said valve means having one operating position closing said open end of said housing and another operating position affording displacement of said filtering means therethrough into and out of said housing,
 means providing radiation shielding around said housing and valve means and a tunnel in said shielding extending laterally of said valve means in registry therewith,
 operator means having one end protruding out of said shielding and another end associated with said filtering means, said operator means being displaceable axially through said aperture for moving said filtering means into and out of said housing through said valve means,
 means providing a receptacle in said tunnel for receiving said filtering means,
 means coupling said filtering means to said operator means in a manner affording uncoupling when said filtering means is located in said receptacle, and
 means for moving the receptacle into and out of registry with said valve means,
 whereby the filtering means may be removed from the housing and placed into the receptacle from a location remote from the housing and the receptacle to minimize radiation exposure to operating personnel.

18. Apparatus according to claim 17 including means providing a tubular extension with an open end depending from said valve means to afford passage of said filtering means therethrough, a bag mounted on said extension with the bottom of said bag extending across said open end of said extension for engaging the bottom of said filtering means when said operator means is displaced downwardly through said housing, and means for releasably mounting said bag to said valve extension and constricting the top of the bag around at least a portion of said filtering means during its ejection from said valve means extension, whereby undrained fluid remaining in the housing is discarded along with the filtering means.

19. Apparatus according to claim 17 including means providing a movable radiation shield in the top of said tunnel means below the lower end of said valve means and means mounting said radiation shield for movement transversely to the path of movement of said operator means, said moveable shield having a closed position extending across said path and an open position alongside said path, so that the movable radiation shield absorbs radiation directed downwardly into said tunnel when radioactive fluid flows through the housing, whereby exposure to radiation of workmen in the tunnel is minimized.

* * * * *

UNITED STATES PATENT OFFICE
CERTIFICATE OF CORRECTION

Patent No. 3,890,233          Dated June 17, 1975

Inventor(s) Edwin H. Gischel

It is certified that error appears in the above-identified patent and that said Letters Patent are hereby corrected as shown below:

Claim 10 in the patent should read as follows:

10. Apparatus according to claim 1 wherein said valve means includes a ball valve having spaced seats and telltale drain means connected to said valve intermediate said seats for detecting wear of the seat closest to the filter housing.

Signed and Sealed this fifteenth Day of June 1976

[SEAL]

Attest:

RUTH C. MASON
Attesting Officer

C. MARSHALL DANN
Commissioner of Patents and Trademarks